United States Patent [19]
Hoffmann

[11] 3,834,157
[45] Sept. 10, 1974

[54] SPINNER DE-ICING FOR GAS TURBINE ENGINES

[75] Inventor: Ambros S. Hoffmann, West Haven, Conn.

[73] Assignee: Avco Corp., Stratford, Conn.

[22] Filed: Feb. 5, 1973

[21] Appl. No.: 329,719

[52] U.S. Cl............ 60/39.09 D, 60/39.08, 415/175, 416/95, 165/87
[51] Int. Cl. .............................................. F02c 7/06
[58] Field of Search........................ 416/94, 95, 96; 60/39.09 D, 266; 415/175; 165/86, 87

[56] References Cited
UNITED STATES PATENTS

| | | | |
|---|---|---|---|
| 2,507,044 | 5/1950 | Palmatier........................ | 416/94 X |
| 2,670,912 | 3/1954 | Lindsey et al. ................ | 60/39.09 D |
| 2,779,423 | 1/1957 | Cushman........................ | 416/94 |
| 2,812,899 | 11/1957 | Meschino....................... | 60/39.09 D |

FOREIGN PATENTS OR APPLICATIONS 629,044  9/1949  Great Britain................ 60/39.09 D Primary Examiner—C. J. Husar
Assistant Examiner—Robert E. Garrett
Attorney, Agent, or Firm—Charles M. Hogan; Gary M. Gron

[57] ABSTRACT

The inlet spinner of a gas turbine engine is de-iced by directing a stream of heated lubricant from the lubrication system of a gas turbine engine against a generally concave heat transfer surface formed on the interior of the inlet spinner. The heat transfer surface is formed to maximize the transfer of heat from the lubricating fluid to those portions of the exterior surface of the spinner that tend to accumulate ice. The heat transfer surface also provides a pumping action which produces a continuous flow of lubricant across it.

22 Claims, 3 Drawing Figures

PATENTED SEP 10 1974　　　　　　　　　　3,834,157

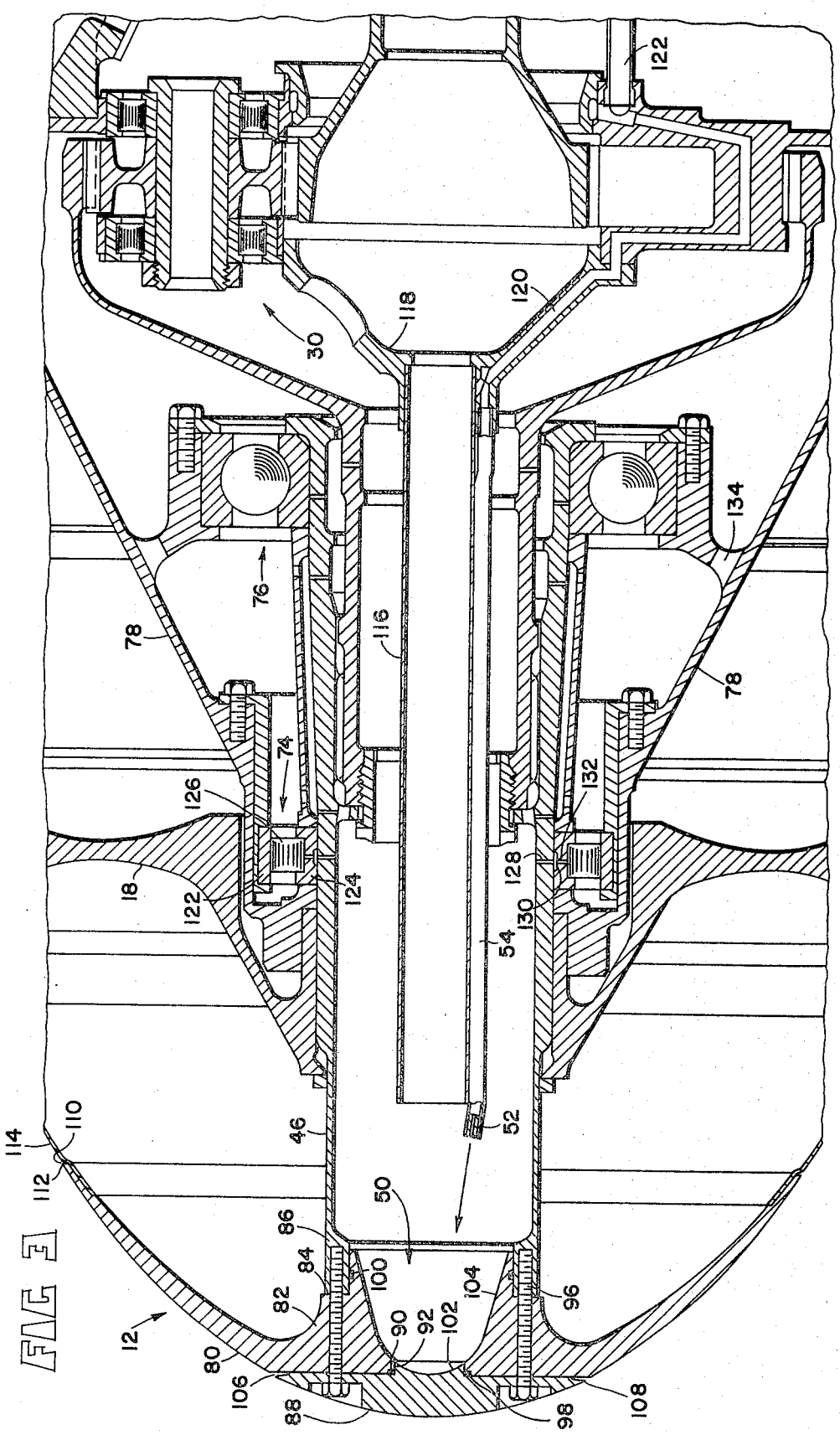

SPINNER DE-ICING FOR GAS TURBINE ENGINES

The present invention relates to de-icing and more particularly to the de-icing of a gas turbine engine air inlet.

Soon after the gas turbine engine was developed the operational problems of ice formation at the engine air inlet were recognized. Aircraft gas turbine engines operated under temperature and humidity conditions which could promote the formation of substantial layers of ice on the inlet of the engine, thereby seriously restricting inlet air flow and producing a "flame-out."

There have been numerous systems proposed and adopted to de-ice the inlet regions of a gas turbine engine to eliminate this problem. Generally speaking, each of these systems bleeds a portion of the hot gas stream flowing through the engine and directs it through passages in heat transfer relation to the inlet elements. The fluid then passes through ports into the air stream flowing into the engine. This heated fluid causes the inlet surfaces to be heated and effectively removes or prevents the accumulation of ice. In the very beginning of gas turbine engine development, heated gas was taken from the turbine discharge, since the gas at that point was at a sufficiently high temperature for de-icing purposes. As gas turbine engine technology advanced, bleed air for this purpose was taken from the compressor discharge and finally recent advanced technology engines utilize bleed air from the initial stages of the compressor.

While some of these proposals are more efficient than others, they all have a common problem. This problem is that the extraction of the air or heated fluid from the motive gas stream passing through the engine significantly affects the overall efficiency of the engine. The reason for this is that air is bled from the motive gas stream at a high energy point and re-introduced at a low energy point. If these de-icing systems were operated continuously this penalty would seriously hamper the overall effectiveness of the engine.

To minimize these effects, schemes have been proposed to operate the de-icing mechanism on an "as needed" basis, either when ice is detected or suspected. This scheme, however, adds a great deal of complexity to the system in the form of adequate control valves and sensors.

Accordingly, it is an object of the present invention to effectively de-ice the inlet of a gas turbine engine without extracting bleed air from the motive gas stream flowing through the engine.

These ends are achieved by a de-icing system for an annular hollow rotatable inlet spinner of a gas turbine engine. This system comprises a heat transfer surface on the interior of the spinner, the heat transfer surface being rotatable with and in heat transfer relation to the exterior surface of the inlet spinner upon which ice has a tendency to form. A means is provided for directing a stream of hot liquid against the heat transfer surface thereby heating the exterior surface of the inlet spinner.

The above and other related objects and features of the present invention will be apparent from a reading of the following description of the disclosure shown in the accompanying drawings and the novelty thereof pointed out in the appended claims.

In the drawings:

FIG. 3 is a fragmentary enlarged longitudinal section view of the inlet of a gas turbine engine which has a de-icing system embodying the present invention.

Figure 1:
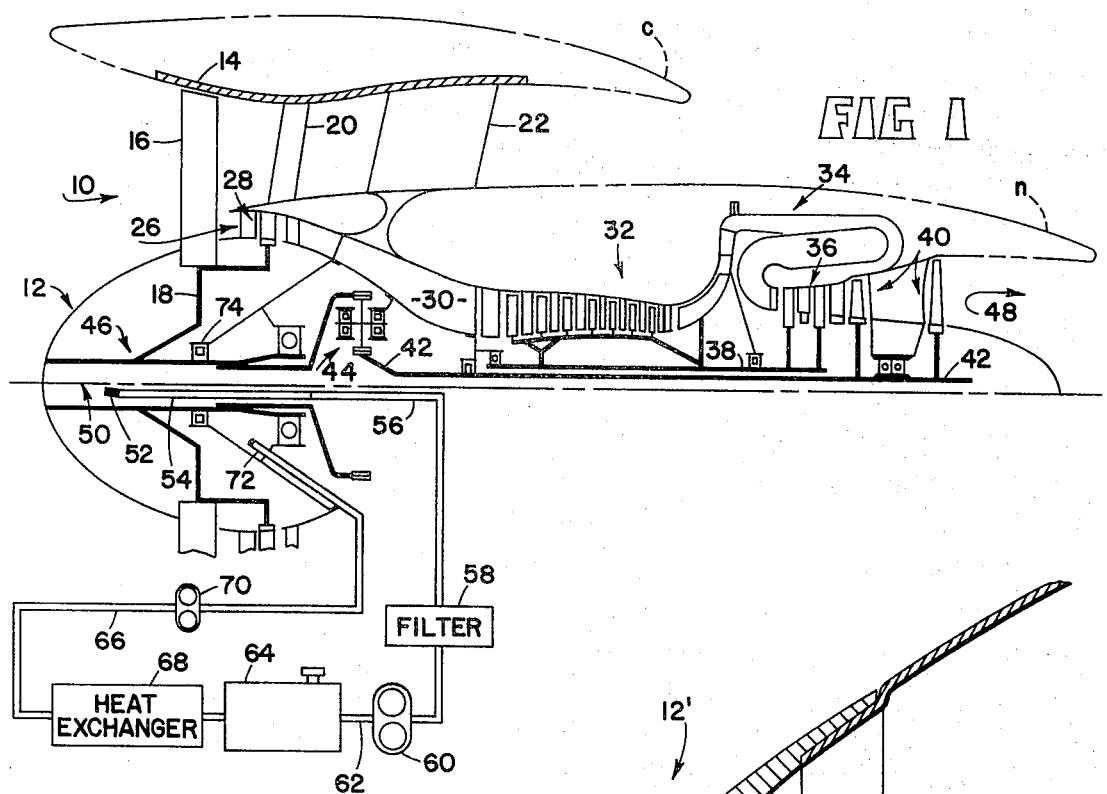
FIG. 1 is a simplified overall view of a gas turbine engine in which the present invention is incorporated.

Referring to FIG. 1, there is shown a gas turbine engine with which the present invention may be used. This gas turbine engine comprises an inlet 10 defined by an inlet spinner 12 and an outer fan shroud 14 which may be incorporated in an outer cowling c, indicated in phantom. A series of fan blades 16, secured to a hub 18, rotate to accelerate air past fan stator vanes 20, structural support vanes 22 for discharge from fan outlet 24 to provide a forward thrust.

A portion of the air accelerated by the fan blades 16 passes into a core engine inlet 26 through a core engine supercharging stage, generally referred to by 28, and through an annular inlet passage 30 to a compressor assembly 32 which comprises a multistage axial flow compressor coupled to a centrifugal impeller. The air that has been pressurized by the compressor 32 is delivered to a combustor 34 in which fuel is mixed with the air and ignited to provide a hot gas stream.

The hot gas stream passes across a core engine turbine assembly 36 which drives the compressor 32 through a shaft 38. From there the gas stream passes across a fan turbine assembly 40 which drives the fan disc 18 through a fan turbine shaft 42, speed reduction gear assembly 44 and hollow fan support shaft 46.

The gas stream that passes from fan turbine assembly 40 is discharged from the engine through core engine outlet 48 to provide an additional forward thrust for the engine. A suitable nacelle n, shown in phantom, provides a streamlined flow path around the engine.

The inlet region of the engine, and particularly the inlet spinner 12, tends to accumulate ice under certain temperature and humidity conditions under which the engine operates. In order to eliminate these conditions the de-icing system described below is incorporated in the engine.

This de-icing system comprises a heat transfer surface, generally indicated by reference character 50, positioned in the interior of the inlet spinner 12. This heat transfer surface 50 is rotatable with and in heat transfer relation to the exterior surface of the inlet spinner 12. A stream of heated liquid is discharged at the heat transfer surface 50 through a nozzle 52 connected to a conduit 54.

Conduit 54 is connected to the high pressure feed line 56 of the engine's lubrication system. The high pressure feed line has a filter 58 incorporated in it to remove contaminants. An engine-driven high pressure pump 60 receives lubricant in the form of a liquid from supply conduit 62 connected to a lubricant storage tank 64. Oil is returned to the tank 64 through a heat exchanger 68 via a return conduit 66 by a scavenge pump 70. The scavenger pump 70 receives lubricant from the various sump chambers of the engine.

One of the return lines 72 feeding the scavenge pump 70 extends to a point adjacent a bearing assembly 74 which journals the disc 18 through fan support shaft 46. As later described, there are radial ports through the walls of shaft 46 to the anti-friction elements of the bearing assembly 74. Lubricating fluid which passes through these ports is collected by line 72 for delivery to the scavenge pump 70.

Referring to FIG. 3, the de-icing system is shown in greater detail. The fan disc 18 is telescoped over and secured on hollow fan support shaft 46. Shaft 46 is journaled by bearing assembly 74 and, in addition, a bearing assembly 76 both of which are supported by a generally conical frame 78.

The inlet spinner 12 comprises annular downstream section 80 having a streamlined diverging outer shape and an integral inner hub portion 82. Hub 82 has a shoulder 84 abutting a thickened end flange 86 of shaft 46. A nose section 88 of the inlet spinner 12 is disc-like and has a curved, generally convex outer surface blending in with the streamlined shape of the downstream section 80. Nose section 88 has a central boss 90 telescoped into a bore 92 in the hub 82 of the downstream section 80. Suitable bolt assemblies 96 sandwich the nose section 88, downstream section 80 and the forward end of the shaft 46. A pair of O-rings 98 and 100 provide oil seals between the parts.

The heat transfer surface 50 is generally concave and has a first portion 102 in heat transfer relation to the nose section 88 and a second annular diverging portion 104 in heat transfer relation to the hub 82 of the downstream section 80.

A circumferential groove 106 is formed at the periphery of the disc 88 to form a lip 108. A second circumferential groove 110 defining a lip 112 is defined by the junction of the end of the downstream section 80 with a thin annular duct element 114 forming an inner shroud ahead of the fan blades 16.

The nozzle 52 is incorporated in the end of conduit 54 and angled to direct a stream of lubricating fluid against the heat transfer surface 50. Conduit 54 extends substantially the length of shaft 46 and is supported on a relatively thin wall tube 116 which has a substantially greater diameter than that of the conduit 54. Both tube 116 and conduit 54 are supported by a support structure 118 which is used to support and journal the reduction gear assembly 30. A circuitous network of passageways 120 connects the end of conduit 54 to an inlet 122 that is connected to the lubricating system high pressure feed line 56 (see FIG. 1).

The bearing assembly 74 that journals the disc 18 through shaft 46 has an outer race 122 suitably connected to frame element 78 and an inner race 124 telescoped over and secured on shaft 46. A plurality of anti-friction roller elements 126 are maintained between the inner and outer races. A series of radial ports 128 are formed in shaft 46 in alignment with the inner race 124 of bearing assembly 74. Inner race 124 has an annular recess 130 formed to connect with the ports 128. A series of ports 132 extend from recess 130 through the inner race 124 for passing lubricant to the rollers 126. Lubricant that has passed through bearing assembly 74 flows down the lower portion of frame element 78 through a passage 134 for connection with the return line 72 of the lubrication system (see FIG. 1).

Figure 2:
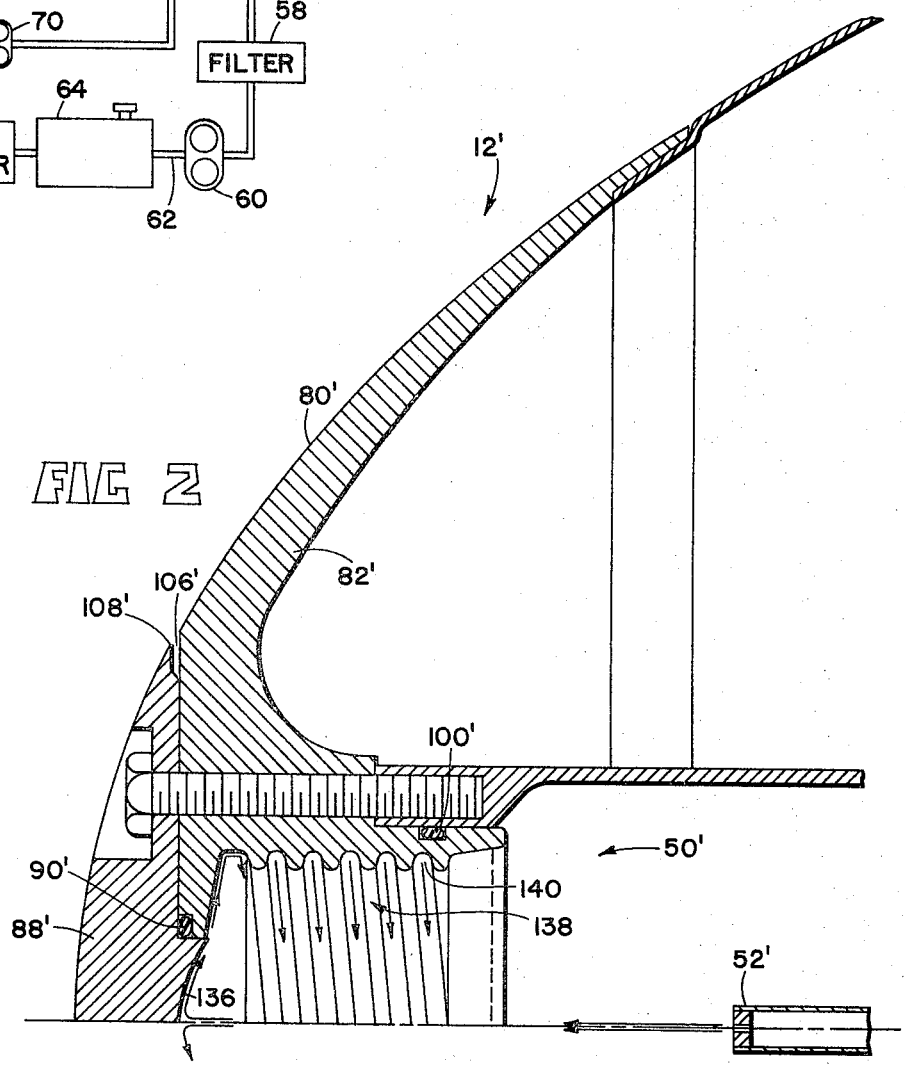
FIG. 2 is a greatly enlarged longitudinal fragmentary view of the inlet of a gas turbine engine showing an alternate embodiment of the present invention.

FIG. 2 shows an alternate configuration for the heat transfer surface 50'. In this embodiment the boss 90' of the nose section 88' has a first heat transfer surface 136 which is concave and has a smooth contour. The hub portion 82' of the downstream section 80' has a generally concave surface 138 with a spiral groove 140 formed in it. In the illustration of this embodiment the nozzle 52' is shown positioned along the axis of the spinner 12' for illustrative purposes. However, in practice the nozzle would be positioned to the side of the axis and supported by a tube similar to the tube 116 shown in FIG. 2. A pair of O-rings 98' and 100' provide oil seals between the parts.

The operation of the de-icing system takes place as described below in connection with FIG. 1. During operation of the engine the lubrication system constantly supplies pressurized lubricant in liquid form through the high pressure supply line 56. In normal operating conditions the lubricant has a temperature in line 56 of approximately 200°. The lubricant in this line is used to lubricate and cool the bearing assemblies supporting the various rotors in the engine. In addition, it is discharged in the form of a stream from nozzle 52 against the heat transfer surface 50 adjacent its center of rotation. Since heat transfer surface 50 is in heat transfer relation to the exterior of inlet spinner 12, it effectively de-ices the surface by heating the surface sufficiently to melt any ice that has a tendency to form.

Turning now to FIG. 3, the heat transfer surface 50 is arranged in such a fashion that heat is preferentially transferred through the hub 82 to the downstream section 80 of the inlet spinner 12. This is accomplished by providing a greater area for the heat transfer surface for downstream section 80 than for the surface for nose section 88. The reason for this is that there is a greater tendency for ice accummulation on the downstream section 80 than on the nose section 88.

When the ice has melted it tends to lay on the exterior surface of the spinner because of its surface tension. The circumferential grooves 110 and 106 cause the surface tension to be broken and overcome by centrifugal force, thereby throwing the water outward to be passed into fan inlet 10.

Since the heat transfer surface 50 is rotating with the inlet spinner 12, the lubricant that has been delivered to it travels radially outward because of centifugal force. The heat transfer surface generally diverges to the interior walls of shaft 46 so that the lubricant flows in a thin film to these walls and the continuous flow of fluid causes a pumping action to be set up. In some instances it is only sufficient to connect the interior end of the shaft 46 to the lubricant system return. However, in the engine shown the lubricant is permitted to pass radially outward through ports 128 to lubricate and cool bearing assembly 74. From there the lubricant may pass through port 144 to be collected by the scavenge pumps in the usual fashion. If desired, additional bearing elements and splines may be lubricated using this continuous flow of lubricant along the interior walls of shaft 46.

The configuration of the heat transfer surface 50' shown in FIG. 3 permits an even greater transfer of heat from the lubricant to the downstream section 80' of the inlet spinner 12'. This is accomplished with the use of the spiral groove 140 which extends in a direction opposite to that for the direction of rotation of the engine to cause the lubricant to pass to the aft end of the second portion 138 through the groove 140. For example, if the engine rotates in a clockwise direction when viewed from the front, the groove 140 extends in a counterclockwise direction. The lubricant travels at a relatively high velocity through the groove 140 in a thin layer. This substantially increases the path the lubricant must traverse before it leaves the heat transfer surface 50 but, in addition, greatly increases the velocity. As an example, the velocity through the groove 140 is at a level of over 50 ft./sec. compared to about 2 ft./sec. for a smooth heat transfer surface. As a result, the heat transfer efficiency to the hub 82' is substantially increased, further increasing the efficiency of de-icing the exterior surface of the inlet spinner.

It is important to note that the system described above effectively de-ices the inlet spinner continuously without extracting any of the motive fluid passing through the engine. This assumes great importance since it permits a continuous de-icing process without any substantial reduction in engine efficiency. In fact, the inlet spinner would act as a heat exchanger for the lubricant in the sense that it takes heat away from the lubricant as the lubricant de-ices the inlet spinner. Since the system is operated continuously there is no need to provide mechanism that terminates and initiates operation of the de-icing system. Thus, what heretofore has been a very complex expensive system is essentially a simple scheme requiring no control logic. This greatly reduces the cost of the system and permits a more reliable and simplified engine.

While a preferred embodiment of the present invention has been described, it should be apparent that other embodiments may be incorporated without departing from the spirit and scope of the present invention.

Having thus described the invention, what is claimed as novel and desired to be secured by Letters Patent of the United States is:

1. A de-icing system for an annular hollow inlet spinner of a gas turbine engine rotatable about an axis and having an aerodynamic diverging outer shape terminating in a first diameter, said system comprising:
   an annular heat-transfer surface on the interior of said spinner and having a diameter substantially less than said first diameter, said heat transfer surface being rotatable with and in heat transfer relation to the exterior surface of said inlet spinner upon which ice has a tendency to form;
   a nozzle nonrotatable relative to said spinner and spaced from said heat transfer surface for directing a stream of hot liquid against said surface thereby heating the exterior surface of said inlet spinner; and
   means forming a passageway extending aft from and coaxial with said heat transfer surface for carrying liquid away from said heat transfer surface, said passageway means having an interior diameter approximately the diameter of said heat transfer surface.

2. A de-icing system as in claim 1 wherein:
said heat transfer surface is generally symmetrical about the rotational axis of said spinner;
said nozzle directs said stream against said heat transfer surface at a point adjacent its center of rotation; and
said heat transfer surface is contoured to pass said liquid radially outward in response to centrifugal force, thereby producing a flow of heated liquid across said heat transfer surface.

3. A de-icing system as in claim 2 wherein said heat transfer surface has a smooth concave contour.

4. A de-icing system as in claim 2 wherein said heat transfer surface has a contour producing a predetermined high liquid velocity relative to the surface.

5. A de-icing system as in claim 4 wherein said surface includes a generally concave contour with a spiral groove formed therein.

6. A de-icing system as in claim 1 wherein said heat transfer surface has a preferential heat transfer path to the downstream regions of said inlet spinner.

7. A de-icing system as in claim 6 wherein said spinner comprises a nose section and a downstream section, and wherein said heat transfer surface provides a preferential heat transfer to said downstream portion.

8. A de-icing system as in claim 7 wherein said spinner comprises an annular diverging streamlined downstream section and a shallow disc-like nose section secured to the forward end of said downstream section, and wherein:
   said heat transfer surface comprises a first portion integral with the interior side of said nose section and an adjacent second portion integral with the interior of said annular downstream section, the heat transfer area of said second portion being substantially greater than the heat transfer area of said first portion.

9. A de-icing system as in claim 8 wherein the first portion of said heat transfer surface has a smooth concave contour and the second portion has a generally concave contour with a spiral groove formed therein.

10. A de-icing system as in claim 9 wherein said downstream section has a thickened interior adjacent the second portion of said heat transfer surface and the nose section has a small diameter boss relative to the diameter of said nose section, said boss being telescoped into said downstream section and having said first portion of the heat transfer surface formed on its end face.

11. A de-icing system as in claim 1 further comprising means on the exterior surface of said spinner for shedding water radially outward, said water-shedding means being positioned downstream of and adjacent the exterior surface regions over which ice has been turned into water by heating the exterior surface of said inlet spinner.

12. A de-icing system as in claim 11 wherein said water-shedding means comprises circumferential grooves positioned adjacent the de-icing regions of said spinner and having a lip formed between their forward wall and the exterior surface of said spinner, thereby causing surface tension of said water on said spinner to decrease to a point where the water is thrown outward by centrifugal force.

13. A de-icing system as in claim 12 wherein said spinner comprises an annular diverging streamlined downstream section and a shallow disc-like nose section secured to the forward end of said downstream section and wherein one of said circumferential grooves is formed at the junction between said nose section and said downstream section.

14. A de-icing system as in claim 13 wherein the other of said circumferential grooves is formed in part by the downstream edge of said downstream section.

15. A de-icing system as in claim 1 wherein said stream of hot liquid comprises a lubricant.

16. A de-icing system as in claim 15 further comprising means for pressurizing said lubricant and conduit means for connecting said pressurized lubricant to said nozzle.

17. A de-icing system as in claim 15 wherein said inlet spinner connects with a disc having a plurality of fan blades, said disc being journaled for rotation by a bearing assembly and wherein said passageway means comprises a hollow shaft surrounding and extending axially from said heat transfer surface to a point adjacent said bearing assembly, said shaft having radial ports positioned to pass lubricant that has flowed from the heat transfer surface radially outward through said ports to lubricate said bearing.

18. A de-icing system as in claim 17 wherein said bearing assembly comprises a fixed outer race, a rotatable inner race and a plurality of anti-friction elements therebetween, said shaft being telescoped into the inner race of said bearing and said bearing having means forming passageways interconnecting with said radial ports in the shaft to pass a flow of lubricant to said anti-friction elements.

19. A de-icing system as in claim 18 further comprising:
means for pressurizing a source of heated lubricant;

passageway means connecting pressurized lubricant from said pressurizing means to a point adjacent the aft end of said shaft;
a conduit extending axially from said passageway means through said tube to a point adjacent said heat transfer surface, said conduit having said nozzle positioned therein to direct a stream of fluid against said heat transfer surface at a point substantially adjacent the rotational axis thereof.

20. A de-icing system as in claim 19 further comprising a thin wall tube adjacent the side of said conduit, said thin wall tube having a substantially greater diameter thereby supporting said conduit and minimizing bending thereof.

21. A de-icing system as in claim 17 wherein:
said inlet spinner comprises an annular diverging streamlined downstream section and a shallow disc-like nose section secured to the forward end of said downstream section;
said heat transfer surface comprises a first portion having a smooth concave contour integral with the interior side of said nose section and an adjacent second portion integral with the interior of said annular downstream section, said second portion of the heat transfer surface having a generally concave contour with a spiral groove formed therein;

said downstream portion of said spinner being connected to said shaft so that the end of the second portion of said heat transfer surface telescopes into the end of said shaft.

22. A de-icing system as in claim 21 further comprising:
a first circumferential groove formed at the junction between said nose section and downstream section of said inlet spinner; and
a second circumferential groove formed at the downstream edge of said streamlined downstream section.

* * * * *